United States Patent Office 2,793,925
Patented May 28, 1957

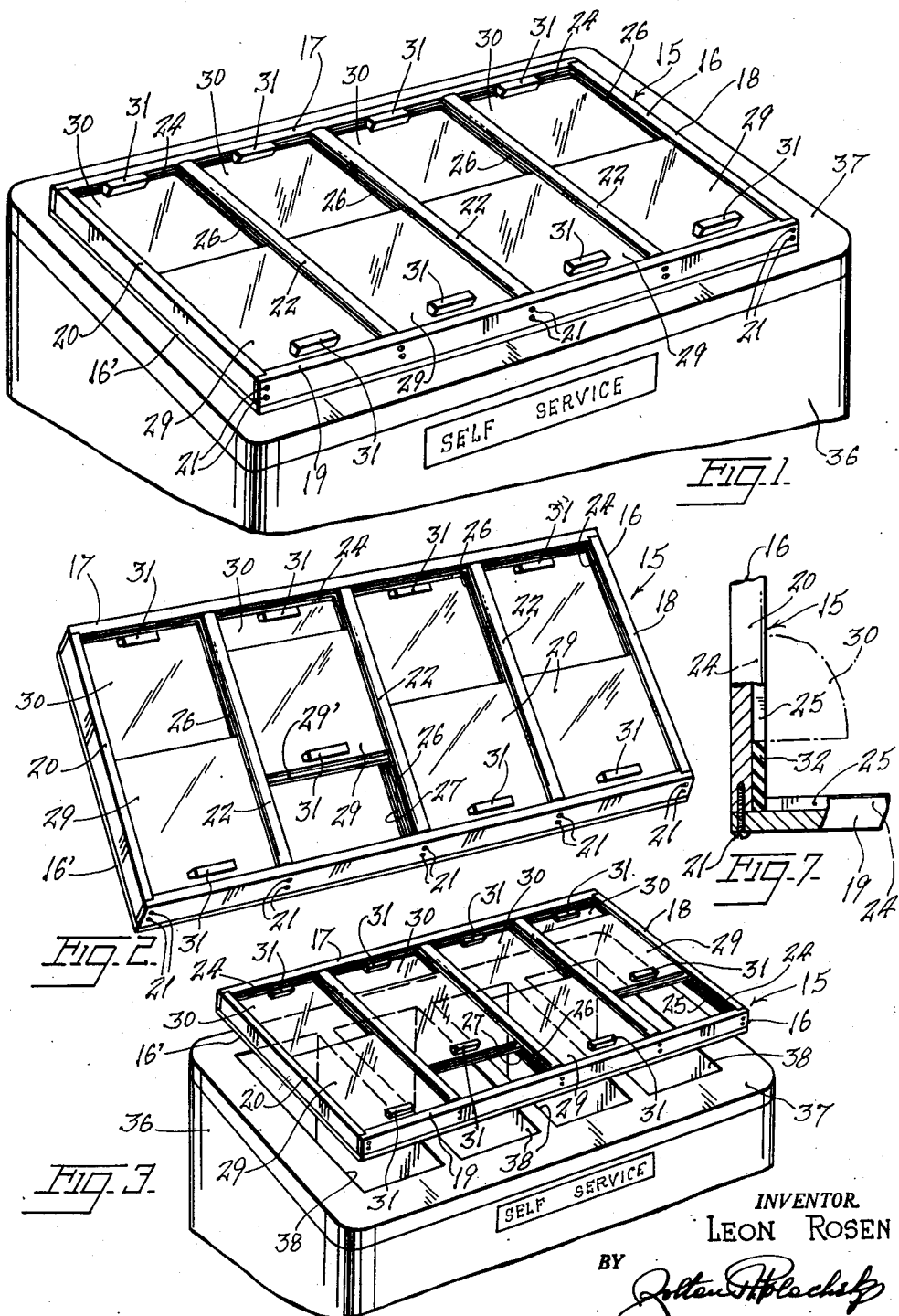

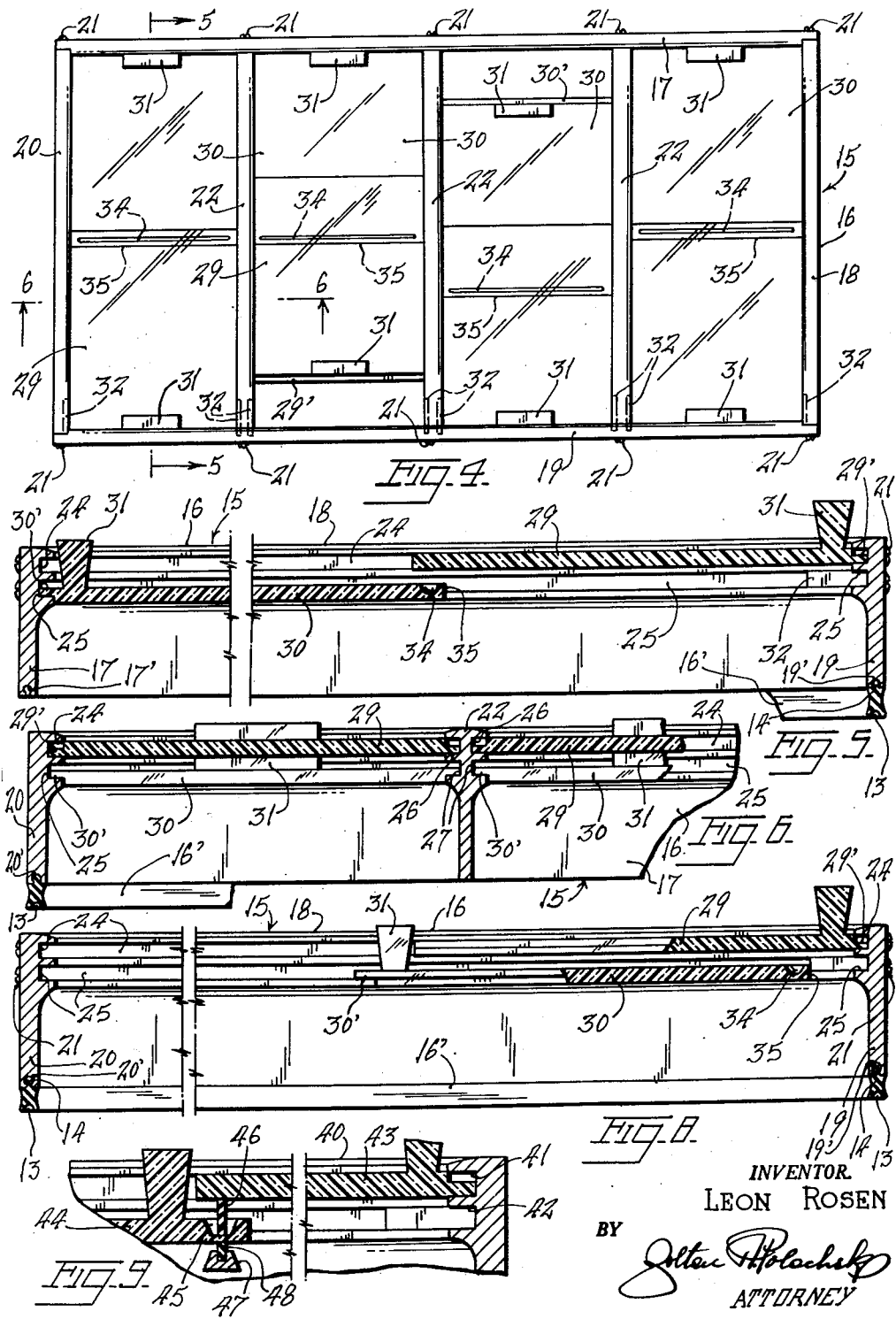

2,793,925
TRANSPARENT SLIDE COVER FOR FROZEN FOOD CABINETS

Leon Rosen, Brooklyn, N. Y.

Application November 1, 1954, Serial No. 465,777

2 Claims. (Cl. 312—138)

This invention relates to new and useful improvements in cabinet covers for frozen food, ice cream and like cabinets.

More particularly, the present invention proposes the construction of an improved removable transparent sliding panel cabinet cover which can be used on conventional lid cabinets to convert them to self-service units at a minimum of expense and to give product visibility and convenience to customers while still permitting the cabinet to be closed to make refrigeration as inexpensive as possible.

As a further object, the present invention proposes forming the cabinet cover of one-piece design with aluminum ribs and heavy crystal-clear sliding panels slidably mounted in the frame to slide back and forth from either side of a cabinet so that a customer can reach into the rear sections of the cabinet with as much ease as in the front sections.

Still further, the present invention proposes constructing the frame with cross members easily removable by a simple operation of removing two screws so that if a panel gets seriously damaged and has to be removed, only that panel can be removed from the cover and a new one inserted.

Another object of the invention proposes forming the panels of easily re-buffed transparent plastic, such as Plexiglas, impregnated with silicon so that no fogging or clouding on the inside will occur and to increase water repellency.

The present invention further proposes providing a durably constructed sliding panel clear view cabinet cover which will beautify a cabinet, invite self-service by permitting one hand to slide a panel with ease to remove packages from the cabinet and which will provide unobstructed transparency for full view of merchandise compartments.

A still further object of the invention proposes providing no-drip means in the new cover to prevent moisture drip on mechandise in a cabinet and to make it easy to remove condensation from the cover panel surfaces.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective fragmentary view of an ice cream cabinet equipped with a cover constructed and arranged in accordance with the present invention.

Fig. 2 is a perspective view of the cover shown in Fig. 1.

Fig. 3 is a perspective view similar to Fig. 1 but with the cover raised as in putting it on or taking it off the cabinet.

Fig. 4 is a top plan view of the cover structure shown in Figs. 1, 2 and 3.

Fig. 5 is a sectional view taken on line 5—5 of Fig. 4.

Fig. 6 is a fragmentary sectional view taken on line 6—6 of Fig. 4.

Fig. 7 is an enlarged corner view of Fig. 4 with parts broken away and in section.

Fig. 8 is a view similar to Fig. 5 but showing the sliding panels in a different position.

Fig. 9 is a fragmentary sectional view similar to Fig. 5 but illustrating a modification of the present invention.

The removable transparent sliding panel cabinet cover, in accordance with the first form of the invention illustrated in Figs. 1 to 8, inclusive, is generally designed by the reference numeral 15.

Cover 15 has a rectangular frame 16 made of channel rod and preferably of aluminum such as aircraft quality satin finished 1¼" x ⅝" thick #63ST. Frame 16 is made up of four such channel rods 17, 18, 19 and 20 connected together at the corners by stainless steel fasteners such as screws 21 (see Fig. 4). In addition, cross members 22 are provided in spaced relation in the frame and secured removably therein by the fasteners 21. Cross members 22 are also preferably made of aluminum of the same quality and finish as the rest of the frame.

The members 17, 18, 19 and 20 of the frame 16 contain spaced channel runs 24 and 25, one run being disposed above the other. Likewise, cross members 22 have like spaced channel runs 26 and 27.

Slidably contained in the channel runs 24 and 25 of the frame side members and in the channel runs 26 and 27 of the cross members 22 are pairs of transparent panels 29 and 30, the panel 29 of each pair being the lower panel and panel 30 being the upper panel.

These panels operate over each compartment of a chest type cabinet in a frame in which the plastic panels are about 12" x 12", which is approximately the size of the prescribed hole of a chest type cabinet. For instance, an "8 hole double" describes a cabinet having sufficient openings to have eight approximately 12" x 12" holes for ice cream cans.

Panels 29 and 30 are mounted across the rectangular frame each pair of panels being positioned in the frame with panels in partially overlapping condition and adapted to slide in parallel spaced relation one across the other crosswise of the frame. Panels 29 and 30 are preferably made of a clear plastic such as crystal clear heat resistant aircraft quality 5/16" thick Plexiglas. In addition, the panels 29 and 30 are impregnated with silicon to increase water repellency and to cut down fogging or discoloration.

Handles 31 are provided on each panel 29 and 30 and resilient bumpers 32 are mounted in the channel runs to stop the sliding of the panels and prevent one panel of a pair from hitting the handle of the other panel of that pair (see Fig. 8). Preferably the handles 31 are an integral part of the panel. Each handle may be etched or otherwise marked "Serve Yourself."

Panels 29 and 30 have side slide recessed marginal portions 29' and 30', respectively, adapted to be disposed in the channel runs. In addition, the lower panels 30 have "no-drip" grooves 34 (see Fig. 4) in their upper surfaces adjacent their end edges 35 to prevent moisture drip on merchandise in cabinet 36 on which the cover 15 is mounted. The grooves trap any moisture that might form on the stop sides of the panels under conditions of extreme humidity.

Frame 16 is adapted to hug the outer edges of the rubber gaskets 37 surrounding each merchandise compartment 38 of the cabinet 36 by means of a rubber gasket or runner 16'. The gasket 16' runs along the bottom channels 17, 18, 19 and 20 of frame 16 and removably fits into gasket retainer knob-shaped grooves 17', 18', 19' and 20' respectively of the channels 17, 18, 19 and 20. The upper edge of the rubber gasket contains a projecting flange 14 similar in shape to the grooves 17', 18', 19' and 20' and the lower edge of the rubber gasket 16' contains a sealing and insulating groove 13 semicircular in cross section to provide an airtight seal. The rubber gasket 16' is of a depth to allow the panels 29 and 30 to operate a good distance above the cabinet's gasket 37. A special size frame may be made for each cabinet on the market. The frame 16 can simply be placed on the cabinet portion surrounding each merchandise compartment of a cabinet. No bolts or installation is required since the weight of the frame will hold it in place.

No condensation will occur on the underside of the panels 29 and 30, the only condensation occurring on the top-side and only under conditions of extreme humidity. The panels may be removed simply by unscrewing the frame or cross member screws. The frame may be polished with steel wool and the panels buffed with a soft rotary buff using a hard wax. Individual panels may be replaced easily and inexpensively.

The modification of the invention illustrated in Fig. 9 is characterized by the provision of a frame 40 having channel runs 41 and 42 in which are slidably mounted transparent panels 43 and 44, respectively.

Panels 43 and 44 may be of ordinary plastic or glass with lower panel 44 having a trough or groove 45 with a squeegee member 46 embedded therein and disposed against the underside of top panel 43. A wedge-shape trough member 47 is slidably mounted in the frame beneath the lower panel 44 with a squeegee member 48 embedded therein and bearing against the underside of lower panel 44. The squeegee members wipe condensation from the panels as the panels are moved.

It is to be understood that this arrangement provides a completely framed and removable unit which will convert a standard chest type cabinet used in the ice cream field into a self service merchandiser by providing sliding panels over each open compartment on the cabinet. This frame is merely placed without installation, onto the cabinet, and allows the panels to operate about two inches above the level of the cabinet. This allows the panels to operate above the cold level of the cabinet, therefore the panels do not get cold and do not attract as much condensation as they would do, if operated at the level of the cabinet.

Another important feature is that the channel allows a beaded neoprene rubber runner to be set in without cementing to prevent air seepage under the frame. The same rubber runner takes up irregularities on top section of cabinet and also prevents slipping of frame.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A removable, transparent sliding panel cabinet cover for ice cream, frozen food and like cabinets comprising a rigid rectangular frame adapted to rest on top of a cabinet, said frame including side and end rods and transverse rods extending between the side rods, a plurality of pairs of clear transparent panels slidably mounted on said rods across the rectangular frame, each pair of panels being positioned in the frame with panels in partially overlapping condition and adapted to slide in parallel spaced relation one across the other crosswise of the frame, said panels each having an outer side with a handle thereon, said panels being disposed completely to fill the frame, a squeegee member carried by one panel and bearing against one side of the other one of the panels of each pair of panels to wipe condensation therefrom as the panels are moved, and a trough member slidably secured to the frame with a squeegee member removably mounted therein to wipe condensation from the squeegee member-carrying panel.

2. A removable transparent sliding panel cabinet cover for ice cream, frozen food and like cabinets comprising a rigid rectangular frame adapted to rest on top of a cabinet, said frame including side and end rods and transverse rods extending between the side rods, a plurality of pairs of clear transparent panels slidably mounted on said rods across the rectangular frame, each pair of panels being positioned in the frame with panels in partially overlapping condition and adapted to slide in parallel spaced relation one across the other crosswise of the frame, said panels each having an outer side with a handle thereon, said panels being disposed completely to fill the frame, said frame having a lower edge extending therearound with a gasket retainer groove therein and a resilient gasket having an upper flange adapted frictionally to fit into the gasket retainer groove of the frame, said resilient gasket having a lower supporting edge with a sealing and insulating groove therein.

References Cited in the file of this patent

UNITED STATES PATENTS

| 1,721,132 | Orthwine | July 16, 1929 |
| 2,008,950 | Erbach | July 23, 1935 |
| 2,276,635 | Weber | Mar. 17, 1942 |
| 2,414,061 | Richard | Jan. 7, 1947 |
| 2,663,917 | Peterson | Dec. 29, 1953 |
| 2,735,739 | Patriarca | Feb. 21, 1956 |

FOREIGN PATENTS

| 568,824 | Great Britain | Apr. 23, 1945 |